Dec. 18, 1934.  J. PEARLMAN  1,984,544
LENS ATTACHING MEANS FOR CAMERAS
Filed Oct. 15, 1932

INVENTOR
Julius Pearlman
BY
Austin & Dix
ATTORNEYS

Patented Dec. 18, 1934

1,984,544

UNITED STATES PATENT OFFICE 1,984,544

LENS ATTACHING MEANS FOR CAMERAS

Julius Pearlman, New York, N. Y., assignor to International Projector Corporation, New York, N. Y., a corporation of Delaware Application October 15, 1932, Serial No. 637,926

13 Claims. (Cl. 88—57)

This invention relates to new and useful improvements in means for attaching lenses and/or lens supports or adaptors to cameras and has especial reference to such improvements as may be applied to amateur motion picture cameras.

The invention provides an improved simple, durable, practical, efficient and economically manufactured unit which will enable the lenses or lens support to be quickly and easily applied to a camera, and to insure that the lens unit will be properly affixed to the camera only in a definite predetermined operative position.

This invention further provides a simple and efficient means whereby any attempt to attach the lens to the camera in any other than the correct position will be frustrated.

Also the invention provides a simple and efficient means whereby the attachment to and removal of the lens unit from the camera can be accomplished with a minimum effort and complexity on the part of anyone who desires to change the lenses.

Further and more specific purposes, features and advantages of the invention will more clearly appear from a consideration of the specification hereinafter when taken in connection with the accompanying drawing which forms part of the specification and which illustrates a present preferred form of the invention.

Briefly, the invention comprises a camera having an apertured wall adapted to receive a lens or lens mount or adaptor in a normal manner. Associated with this wall are suitable latch elements adapted to cooperate with the lens mount or support. This lens support is preferably attached to the lens casing and is provided with projecting flanges or other means to cooperatively latch with the latching elements on the camera wall. The lens support or mount preferably is provided with a handle and a suitable stop means. The physical arrangement of the latching flanges, the handle, the stop means and the latching element on the camera are so inter-releated that it is impossible for the mount to be attached to the camera except when it is introduced and manipulated in a particular manner so that the lens cannot be applied to the camera except in the desired position. It is obviously a matter of design to reverse this relationship, without changing the functional operation, and place the latch elements on the lens or lens casing while placing the projecting flanges and the like on the camera wall.

The invention furthermore comprises an improved lens mount which preferably is in the form of a ring having a plurality of latching flanges one of which flanges preferably is considerably greater in angular width than the other. These flanges are also provided in some instances with latching depressions adapted to engage with spring pressed means on the camera wall. The lens supporting mount generally is in the form of a sleeve having outwardly extending latching flanges, a stop lug and a handle. These elements are adapted to suitably cooperate with the spring pressed ferrules or sleeves or other suitable holding means on the camera wall and with a stop pin also mounted on the camera wall.

The preferred form of the invention is illustrated in the drawing in which.

Figure 1:
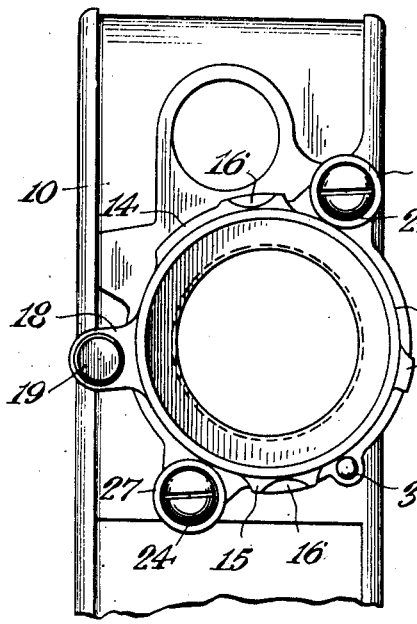
Fig. 1 is a front elevation of a portion of a lens support disposed in position just before the parts are locked together.

The invention has to do with cameras and particularly is applicable to amateur motion picture cameras having a front wall 10 provided with a threaded opening 11 in which ordinarily a lens mount may be disposed. In the present form of the invention, however, a lens casing 12 is embraced at its inner end by a snug fitting sleeve 13 which may be fastened thereto in any suitable manner. This sleeve or mount which forms the support for the lens casing 12 preferably is provided with a plurality of outwardly extending flanges or lips 14 and 15 which act as suitable engaging elements. In this preferred form, the flange 14 is considerably greater in angular length than the flange 15. In many of the structures one or both of these flanges may be provided with a curved depression such as 16 and the sleeve may also be provided with a stop lug 17 and an ear 18 on which a handle 19 is supported.

Any type of suitable holding means may be employed to engage with flanges 14 and 15 to properly and satisfactorily hold the lens support in position on the camera. In the desired structure herein the wall 10 of the camera preferably is provided with apertures 20 and 21 suitably threaded to receive grooves 22 and 23 of set screws which have the usual slotted head 24. The preferred construction of these screws provides a body portion 25 underneath the head and which portion is embraced by a sleeve 26 of a tight fitting ferrule having an outwardly and upwardly extending flange portion 27 on each end. The head 24 of each screw fits within the space formed by and embraced by the outwardly and upwardly extending flange 27 of the ferrule. Disposed beneath the head 24 of each screw is a curved spring washer 28 which tends to force the ferrule 26 inwardly toward the wall 10 of the camera. The shape of each ferrule 26 as described therefore, provides a circumferential downwardly facing shoulder 29 spaced apart from the wall 10 of the camera. It is beneath these shoulders that the flanges 14 and 15 on the lens mount or ring 13 are adapted to be slid. By reason of the pressure of the spring 28, the ferrule will give a slight amount to permit the flanges 14 and 15 to slip under the ferrule until the depressions 16 on the respective flanges come opposite and beneath the ferrule shoulder 29, when the ferrule will spring into place to latch the ring or sleeve 13 into position. At this same instant of time, the stop lug 17 is designed and positioned to engage with a stop pin 30 on the front wall of the camera. It is to be understood that it is not necessary to have the flanges 14 and 15 provided with the depressions 16 as sufficient holding power may be readily provided.

It is to be borne in mind and will be apparent from a careful consideration of the arrangement of the parts that the lens casing and its mount or support in the form of the ring or sleeve 13 cannot be fastened to the front face of the camera unless and until the unit is applied to the front wall in the particular manner shown in Fig. 1.

Figure 2:
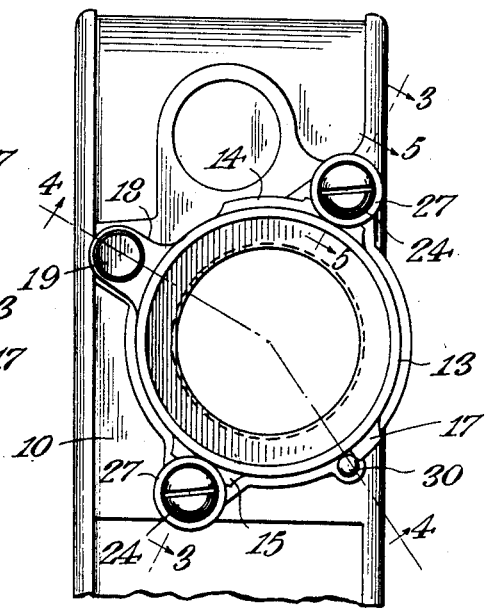
Fig. 2 is a similar view showing the parts in their locked relation.
Figure 3:
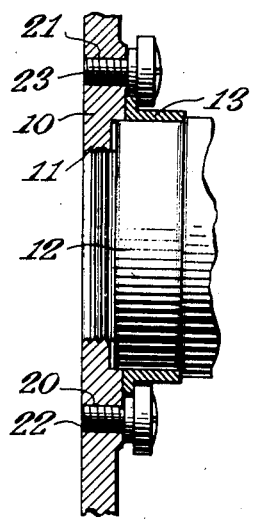
Fig. 3 is a cross-section taken on the line 3—3 of Fig. 2.
Figure 4:
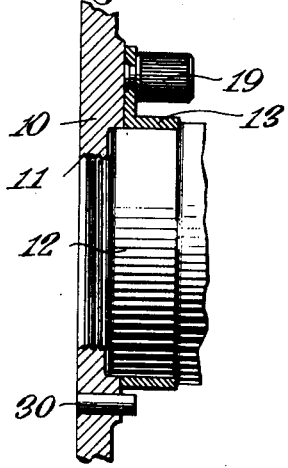
Fig. 4 is a cross-section taken on the line 4—4 of Fig. 2.
Figure 5:
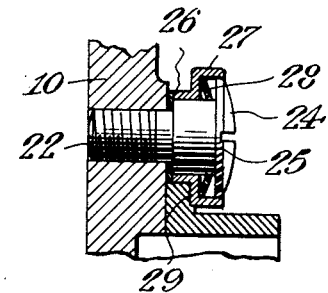
Fig. 5 is a detail cross-section taken on the line 5—5 of Fig. 2.

In this initial position of introduction of the unit to the camera, it will be seen by examining Fig. 3 that the lens casing 12 extends slightly into the recess or aperture formed in the front wall of the camera. This slight depression serving as a guide to the proper introduction of the lens into position. After this preliminary introduction the unit is then turned clockwise from the position shown in Fig. 1 to the position shown in Fig. 2. In this latter position, the movement of the unit is applied and the locking effect between the ferrules 26 and the flanges 14 and 15 have been achieved. The handle 19 is efficient and convenient as a point against which the thumb of the operator may easily press in an angular turning manner in order to smoothly rotate the unit in the manner described.

Similarly in extracting the unit from the face of the camera the thumb may be applied to the opposite side of the handle 19 to rotate the flanges from their locking engagement with the spring pressed ferrule and enable the unit to be readily removed.

The physical dimensions of the flanges 14 and 15, and the relation between these flanges, the handle, the stop lug, and the stop pin and the two spring pressed ferrules or latch members are such that if it is attempted to introduce or apply the unit to the camera in any other initial position than that shown in Fig. 1 the parts cannot be moved into engagement. For instance, if it is assumed that the unit is introduced or placed against the camera in a position 180° from that shown in Fig. 1, then it will be apparent that the flange 14 will ride on top of the stop pin 30 and thus cannot enter beneath the ferrule. If the unit is introduced to the camera in an initial position 90° clockwise from that shown in Fig. 1, then the flange 14 will run into the pin 30 and be prevented from being moved further into engagement with the lower spring pressed latch ferrule. If the unit is introduced in a position 90° counter-clockwise from that shown in Fig. 1, then the handle 19 will be between the pin 30 and the lower ferrule and the flange 15 will be between the top ferrule and the pin. In any of these three positions it may be introduced as usual, but complete latching engagement as originally described will be prohibited because of the physical correlation between the parts which exist in order that they may be initially disposed in one predetermined position before it is possible for the latching arrangement to be effected.

It will, therefore, be observed that this particular mount is so designed and arranged that the lens supported therein is always bound to be presented to the camera in a predetermined position which, of course, is the position desired so that no one may remove the old mount and introduce the new one on the camera and have it fit in the wrong position because the mount simply cannot be applied in the wrong manner. This achievement is particularly advantageous in cameras of this amateur motion picture type where it is essential for anyone not necessarily a camera expert to be able to apply different lenses and be assured that the lens will be affixed in the camera in the right position.

The device which enables the achievement of this object is simple in construction, economical to manufacture, and durable and rugged to withstand continued use in the application of the lens to and removal of the lens from the camera.

It will, therefore, be observed that I have provided a simple, efficient device for supporting the lens in the form of a simple lens mount provided with means cooperating with means on the camera wall which enables the mount to be applied to the camera wall only in a predetermined position to insure proper positioning and action of the lens.

While the invention has been described in detail and with respect to a present preferred form thereof, it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What is claimed, is:

1. A lens unit comprising a lens casing, a ring-like mount attached thereto, oppositely extending latching flanges on said mount, one of said flanges being of greater angular width than the other.

2. A lens unit comprising a lens casing, a ring-like mount attached thereto, oppositely extending latching flanges on said mount, one of these flanges being of greater angular width than the other, said flanges having recesses therein to effect a latching engagement.

3. A lens unit comprising a lens casing, a ring-like mount attached thereto, outwardly extending latching flanges on said mount, one of said flanges being of greater angular width than the other, a stop lug extending outwardly from the mount between said flanges, and a handle lug extending outwardly from the mount on the opposite side of the stop lug.

4. A lens unit which comprises a lens casing, a ring-like mount attached thereto, outwardly extending latching flanges on the mount, one of said flanges being of greater angular width than the other, said flanges having curved recesses in their upper faces to effect latching engagement, a stop lug projecting from the mount and disposed between said flanges and a handle supporting lug extending from the mount on the side thereof opposite the stop lug.

5. In combination a camera having an apertured lens supporting wall, a spring pressed ferrule supported adjacent said aperture and having undercut shoulders spaced from the wall, a lens casing, a mount attached to said casing, outwardly extending latching flanges on said mount to engage the ferrule shoulders, a stop pin on the wall of the camera, a stop lock on said mount to engage said pin, said flanges moveable into cooperative position with the shoulders of the ferrule by turning the lens casing after it has been placed on the camera wall.

6. In combination a camera having an apertured lens supporting wall, a spring pressed ferrule supported adjacent said aperture and having undercut shoulders spaced from the wall, a lens casing, a mount attached to said casing, outwardly extending latching flanges on said mount to engage the ferrule shoulders, a stop pin on the wall of the camera, a stop lock on said mount to engage said pin, said flanges moveable into cooperative position with the shoulders of the ferrule, said flanges having curved recesses in their upper faces to receive a portion of said ferrules when disposed in cooperative position by turning the lens casing after it has been placed on the camera wall.

7. In combination, a camera having an apertured lens supporting wall, a spring pressed ferrule supported adjacent said aperture and having undercut shoulders spaced from the wall, a lens casing, a mount attached to said casing, outwardly extending latching flanges on said mount to engage the ferrule shoulders, a stop pin on the wall of the camera, a stop lock on said mount for engaging said pin, said flanges moveable into cooperative position with the shoulders of the ferrule, said flanges having curved recesses in their upper faces to receive a portion of said ferrules when disposed in cooperative position, the relative positions of the flanges, the stop pin, the stop lug, and the ferrules enabling the lens casing and its mount to be applied to the camera wall and turned to operatively engage the parts only when the application is made in a predetermined manner.

8. In combination a camera wall having a lens receiving aperture, a spring pressed latching means disposed adjacent the aperture, a ring-like support attached to the lens mount, outwardly extending latching flanges on said support, one of said flanges being of greater angular width than the other, a stop pin on the wall, a stop lug on the mount to engage said pin, said flanges adapted to be slid under the latching means into operative position with the lug against the pin, the relative position of the parts and their dimensions permitting application of the lens unit to the camera only in one position.

9. In combination, a camera wall, a lens mount to be attached to said wall, cooperating latching members and flanges on said wall and on said mount to hold the mount on the wall, the size of the various flanges being disproportioned whereby the mount can be applied to the wall in only one position.

10. In combination, a camera wall, a lens mount to be attached to said wall, cooperating latching members and flanges on said wall and on said mount to hold the mount on the wall, said flanges having their angular widths of different sizes whereby the mount can be applied to the wall in only one position.

11. In combination, a camera wall, a lens mount to be attached to said wall, cooperating latching members and flanges on said wall and said mount to hold the mount on the wall, said flanges having curved depressions of relatively small depth for receiving the latching members, the size of the various flanges being disproportioned whereby the mount can be applied to the wall in only one position.

12. In combination, a camera wall, a lens mount to be attached to said wall, cooperating latching members and flanges on said wall and on said mount to hold the mount on the wall, said flanges being of different angular width and each being provided with a depression of relatively small depth, said latching members being spring-pressed and adapted to engage said depressions after the lens mount has been moved into final operating position.

13. In combination, a camera wall, a lens mount to be attached to said wall, cooperating latching members and flanges on said wall and on said mount to hold the mount on the wall, an abutment carried by said camera wall, and a lug carried by the lens mount for engagement with said abutment to properly position said lens mount, said flanges having depressions therein for receiving the latching members when said abutment and said lug are in engagement.

JULIUS PEARLMAN.